(12) United States Patent
Dantlgraber

(10) Patent No.: US 6,978,608 B2
(45) Date of Patent: Dec. 27, 2005

(54) HYDRAULIC UNIT

(75) Inventor: Joerg Dantlgraber, Lohr (DE)

(73) Assignee: Bosch Rexroth AG, Stuttgart (DE)

( * ) Notice: Subject to any disclaimer, the term of this patent is extended or adjusted under 35 U.S.C. 154(b) by 71 days.

(21) Appl. No.: 10/478,127

(22) PCT Filed: May 15, 2002

(86) PCT No.: PCT/DE02/01741

§ 371 (c)(1),
(2), (4) Date: Dec. 1, 2003

(87) PCT Pub. No.: WO03/004242

PCT Pub. Date: Jan. 16, 2003

(65) Prior Publication Data

US 2004/0187488 A1    Sep. 30, 2004

(30) Foreign Application Priority Data

Jul. 3, 2001   (DE) ................................ 101 31 750

(51) Int. Cl.[7] .......................................... B29C 45/17
(52) U.S. Cl. ................................................. 60/454
(58) Field of Search .......................................... 60/454

(56) References Cited

U.S. PATENT DOCUMENTS

| | | | | |
|---|---|---|---|---|
| 3,992,133 A | * | 11/1976 | Brunner | 417/366 |
| 5,078,236 A | * | 1/1992 | Shimoaki et al. | 187/285 |
| 5,104,294 A | * | 4/1992 | Banba | 417/36 |
| 6,168,393 B1 | * | 1/2001 | Huber et al. | 417/360 |
| 6,322,343 B1 | * | 11/2001 | Yoda et al. | 425/62 |
| 6,524,084 B2 | * | 2/2003 | Neumair | 417/372 |
| 6,786,709 B1 | * | 9/2004 | Klahm et al. | 418/39 |

FOREIGN PATENT DOCUMENTS

| | | |
|---|---|---|
| CH | 547 139 | 3/1974 |
| DE | 24 13 691 A1 | 10/1975 |
| DE | 295 03 117 U | 7/1995 |
| DE | 196 12 582 A1 | 10/1997 |
| EP | 1 052 408 A2 | 11/2000 |
| JP | A 2000-117799 | 4/2000 |

* cited by examiner

*Primary Examiner*—Thomas E. Lazo
(74) *Attorney, Agent, or Firm*—Oliff & Berridge, PLC

(57) ABSTRACT

What is disclosed is a hydraulic unit for a plastics processing machine, in particular a hydraulically actuated injection molding machine. In accordance with the invention, the drive mechanism of a pump of a hydraulic circuit is provided inside the tank to ensure optimum acoustic and vibration attenuation.

10 Claims, 2 Drawing Sheets

HYDRAULIC UNIT

Figure 1:
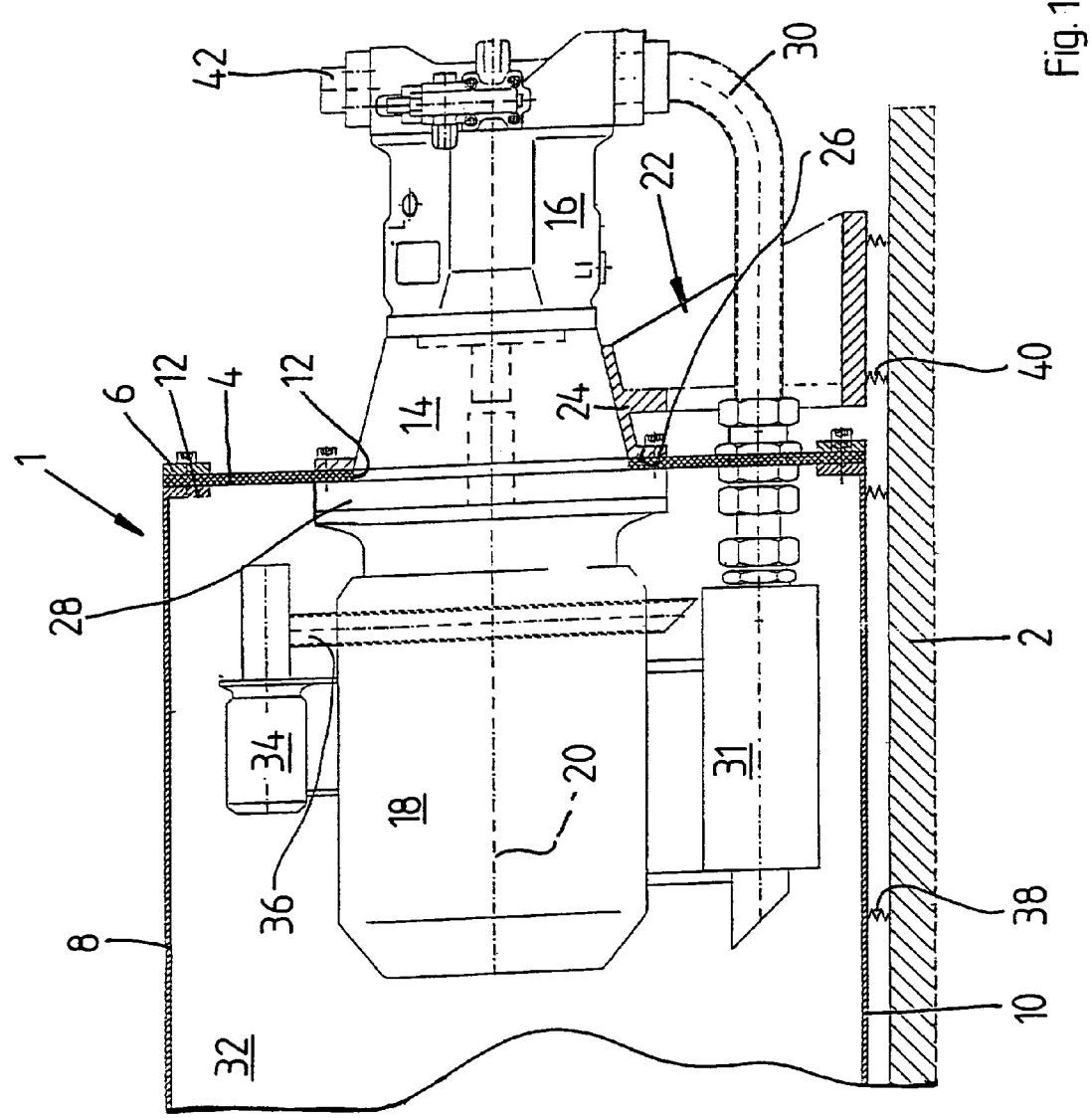

The invention relates to a hydraulic unit.

Despite the increasing use of electrically operated plastics processing machines, in particular injection molding machines, hydraulically actuated machines are still being preferred for high shots and the associated high locking pressures. Machines of this type are characterized by extremely sturdy technology, wherein the hydraulic components make comparatively low demands to maintenance.

In CH 547 139 PS a hydraulic unit for an injection molding machine is disclosed to have a pressure medium tank integrated into the machine base of the injection molding machine. For the purpose of acoustic insulation, the pump of the hydraulic circuit is located inside the tank, with the mounting position being closely above the level of the pressure medium. A pump mounting flange extends through a recess of a side wall and is connected with an externally positioned electrical drive motor.

It was found that considerable acoustic emissions may still occur in such a construction. Customarily air-cooled drive motors are employed in the known constructions. Application of an insulation hood then results in cooling being impeded, so that considerable expense must be incurred through an acoustic labyrinth.

In contrast, the invention is based on the objective of furnishing a hydraulic unit with low acoustic emission while having a simple construction.

This object is attained through a hydraulic unit as described below.

In accordance with the invention, the hydraulic unit has a pressure medium tank arranged in a machine base, with the comparatively noisy drive mechanism of the pump being arranged inside the tank as a closed drive unit, thus ensuring optimum acoustic insulation. In the solution according to the invention, the pump is arranged externally of the tank, so that its maintenance is simplified considerably.

The pump drive preferably is surrounded by pressure medium at least in parts thereof, whereby excellent cooling of the drive motor by the pressure medium is ensured.

One essential drawback of the solution described at the outset is the fact that both the drive mechanism and the pump are attached to the side wall. This side wall therefore has to be designed with sufficient strength to be able to absorb the vibrations transmitted by the drive mechanism and the pump, and to support the considerable weight of these components.

This drawback is overcome in an advantageous embodiment of the invention in that externally of the tank a bracket is provided, whereby both the drive mechanism and the pump are supported on the machine bed, so that the tank wall is only subject to low mechanical load. This wall may then optimally be adapted to its insulation task.

Preferably both the tank and the bracket are mounted elastically, so that a transmission of vibrations is reduced.

It is particularly advantageous to realize the drive motor as an oil-cooled type.

Acoustic emission may be further reduced if a circulating pump for a cooling and filtering circuit is also arranged in the tank.

The pump and drive mechanism axis may extend in the horizontal direction or in the vertical direction.

On the wall of the tank or on the bracket according to the invention, it is moreover possible to arrange a filter and a radiator.

The invention may in general be utilized for hydraulically actuated machines, e.g., plastics or rubber processing machines.

Further advantageous developments of the invention are described herein.

Figure 2:
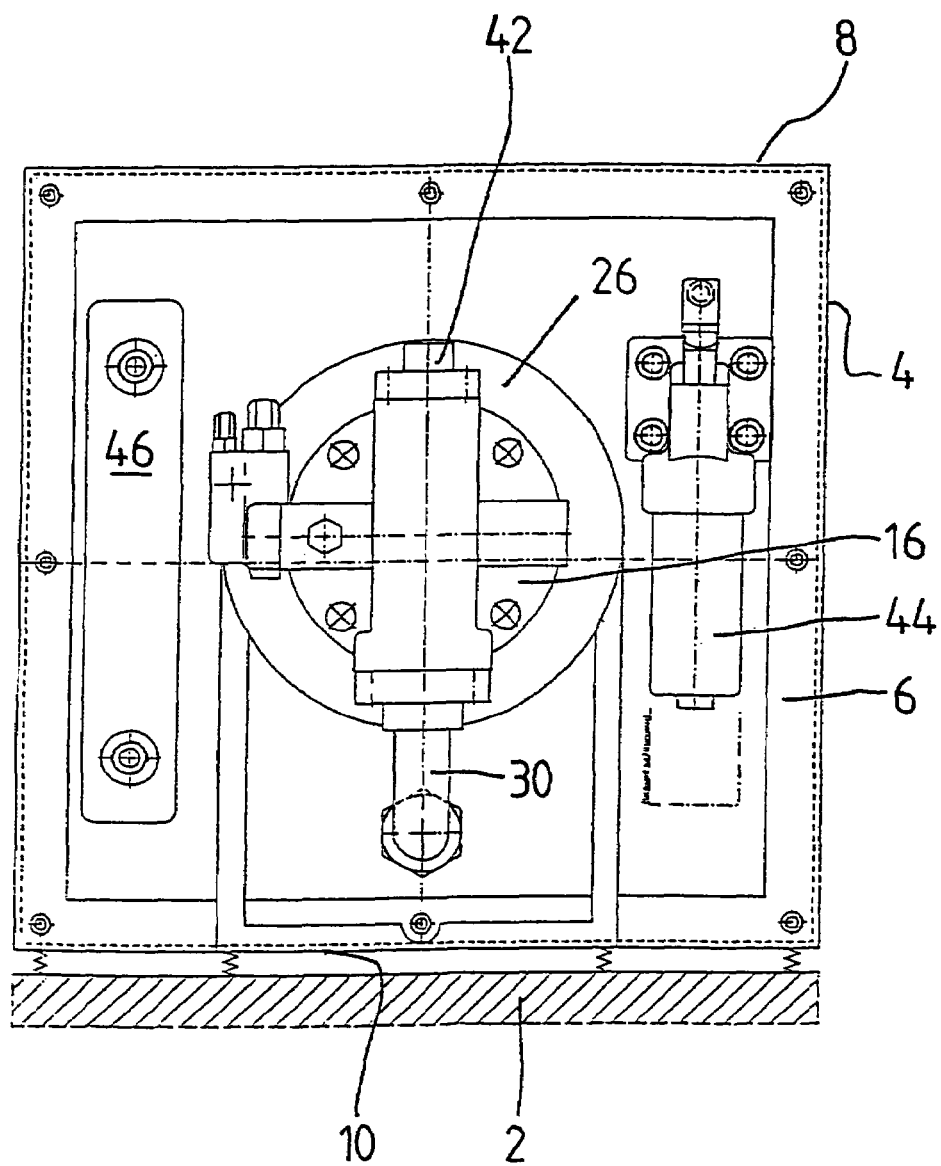

In the following, a preferred embodiment of the invention is explained in more detail by referring to schematic drawings, wherein:

FIG. 1 is a schematic lateral view of a pressure medium tank having a drive mechanism of a pump arranged therein, and FIG. 2 is a view from the right at the arrangement in accordance with FIG. 1.

In hydraulic injection molding machines, generally a clamping unit, an injection unit and a screw plunger are actuated via hydraulic actuating members. The axial movements of clamping unit, injection unit and screw plunger are then performed through the intermediary of hydraulic cylinders, while rotation of the screw plunger during plastification is initiated with the aid of a hydraulic motor.

The pressure medium for supplying pressure medium to the above mentioned hydraulic means is received in a pressure medium tank 1 supported on a machine base 2 of the injection molding machine or on a foundation. In the represented embodiment, the tank 1 consists of several profile members that are screwed together or otherwise connected with each other. The represented tank has an approximately parallelepipedic design, wherein a side wall 4 is fastened via a support frame 6 on contact portions 12 of a top wall or of a bottom wall 10, respectively. In the represented embodiment, the side wall 4 is fabricated of a material having good insulating properties.

Approximately in the center of the side wall 4, a recess 12 is formed into which a clutch housing 14 is inserted. Via this clutch housing 14 a pump 16 of the hydraulic circuit of the injection molding machine is connected with an electrical drive mechanism 18. As may be seen from the representation in accordance with FIG. 1, this electrical drive mechanism 18 is arranged inside the tank 1 while the clutch housing 14 with the pump 16 flanged to it is located externally of the tank 1. The electrical drive mechanism is liquid-cooled, preferably oil-cooled.

The considerable weight of the unit comprised of pump 16, clutch housing 14 and drive mechanism 18, the axis 20 of which extends horizontally in the representation in accordance with FIG. 1, is supported by a bracket 22. In the represented embodiment, the bracket 22 includes a support flange 24 on which the clutch housing 14 is supported. The support flange 24 has a flange ring 26 in which the drive mechanism 18 is fastened with the aid of a flange 28. In accordance with FIG. 1, the side wall 4 is located between the flange ring 26 and the flange 28, so where the material of the side wall 4 is selected appropriately, direct transmission of vibrations from the housing of the drive mechanism 18 to the clutch housing 14 is prevented.

The suction port of the pump is connected via a suction line 30 with the internal space 32 of the tank. This suction line 30 extends through the side wall 4 and is secured to the latter with the aid of suitable piping or tubing connections. In the opening range of suction line 30 a suction pulsation attenuator 31 is arranged, whereby pulsations of the pump in the intake range may be attenuated.

In accordance with FIG. 1, the suction line 30 opens into the lower range of the pressure medium chamber 32.

On the drive mechanism 18 a circulating pump 34 of a coolant or filter medium circuit is placed, with a suction tube 36 extending approximately in the vertical direction in the representation in accordance with FIG. 1, so that the pressure medium may furthermore be used as a coolant.

Both the bracket 22 and the tank 1 are supported on the machine base 2 via attenuation members 38, 40, so that vibrations generated by the drive mechanism 18 or by the pump 16 are not transmitted to the machine base 2 of the injection molding machine, and vice versa are not transmitted from the machine base to the mentioned components.

As the weight of pump 16, clutch housing 14 and drive mechanism 8 is supported on the bracket 22, mechanical load on the side wall 4 is minimal, so that the latter need only be designed with a view to the pressure generated in the tank, and for the rest is optimally adapted to the insulation task.

The above mentioned hydraulic units (hydraulic cylinder, hydraulic motor) of the injection molding machine are connected to a pressure port 42 of the pump 16 via piping or tubing.

In accordance with the lateral representation of FIG. 2, a pressure medium filter 44 and a pressure medium cooler 46 are arranged in laterally staggered configuration beside the pump 16. In the represented embodiment, these are secured on the side wall 4. In principle, these elements might also be immobilized on the bracket 22.

In the represented embodiment, the axis 20 of the pump unit is arranged in the horizontal direction. In an alternative embodiment, the axis of the pump unit might also be arranged in the vertical direction, so that the pump 16 practically rests on the top wall 8 and is supported on the machine base 2 via suitable support means.

In the represented embodiment it is preferred if the drive mechanism 18 with its oil-tightly sealed housing is located within the pressure medium received in the tank 1, whereby on the one hand good cooling is ensured, and on the other hand acoustic insulation is further reduced by the oil jacket. The externally positioned pump 16 may be covered by an acoustic housing, so that the acoustic emissions of the unit are minimum.

As a matter of fact, the tank 1 may also be realized as a cast or welded structure instead of the profile members selected in the represented embodiment. The tank may also be designed to be separate, independent of the machine base.

What is disclosed is a hydraulic unit for a plastics processing machine, in particular a hydraulically actuated injection molding machine. In accordance with the invention, the drive mechanism of a pump of a hydraulic circuit is provided inside the tank to ensure optimum acoustic and vibration attenuation.

LIST OF REFERENCE NUMERALS 1 pressure medium tank
2 machine base
4 side wall
6 support frame
8 top wall
10 bottom wall
12 recesses
14 clutch housing
16 pump
18 drive mechanism
20 axis
22 bracket
24 support flange
26 annular flange
28 flange
30 suction line
31 suction pulsation attenuator
32 pressure medium chamber
34 circulating pump
36 suction tube
38 attenuation member
40 attenuation member
42 pressure port
44 oil filter
46 oil cooler

What is claimed is:

1. A hydraulic unit for a plastics processing machine, in particular an injection molding machine, the hydraulic actuating members of which hydraulic cylinders or hydraulic motors are supplied, via a pump having an electrical drive mechanism, with pressure medium drawn from a tank and capable of being recycled into the tank, characterized in that said drive mechanism of said pump is arranged in said tank said pump which is arranged externally of said tank is mounted on said machine base through the intermediary of a bracket on which said drive mechanism is furthermore supported.

2. A hydraulic unit in accordance with claim 1, wherein said tank is arranged in a machine base of said machine.

3. A hydraulic unit in accordance with claim 1, wherein tank and bracket are elastically supported on said machine base.

4. A hydraulic unit in accordance with claim 1, wherein said drive mechanism is at least partly arranged in said pressure medium.

5. A hydraulic unit in accordance with claim 8, wherein said side wall or said top wall is designed as an insulating wall.

6. A hydraulic unit in accordance with claim 5, wherein said wall carries an oil filter and/or an oil cooler.

7. A hydraulic unit in accordance with claim 1, wherein a circulating pump is arranged inside said tank.

8. A hydraulic unit in accordance with claim 1, wherein an axis of said drive mechanism and of said pump is arranged in the horizontal or vertical direction, so that the unit comprised of pump and drive mechanism extends through a side wall or through a top wall of said tank.

9. A hydraulic unit in accordance with claim 8, wherein said wall carries an oil filter and/or an oil cooler.

10. A hydraulic unit in accordance with claim 1, wherein said drive mechanism is oil-cooled, and said pressure medium has the function of a coolant.

* * * * *